United States Patent Office 3,167,157
Patented Jan. 26, 1965

3,167,157
SEALED VISCOUS FLUID DAMPER
Richard P. Thorn, Erie, Pa., assignor to Lord Manufacturing Company, Erie, Pa., a corporation of Pennsylvania
Filed Feb. 19, 1963, Ser. No. 259,689
1 Claim. (Cl. 188—98)

This invention is a totally sealed viscous damper providing large damping forces in a relatively small envelope. The damper has inner and outer members in telescoping relation. Between the members is a tube of flexible material wtih inwardly re-entrant ends fixed to the inner member and defining an annular cavity holding a viscous damping medium. On axial movement of the inner member relative to the outer member, the position of the damping medium is changed and there is a shearing action producing damping. Amplitude sensitive properties can be added by tapering or shaping the inner member to provide a specific force versus deflection and force versus velocity profile. The damper offers essentially no elastic restraint and is, therefore, useful in mounting systems where returnability to the initial position is desired.

Figure 1:
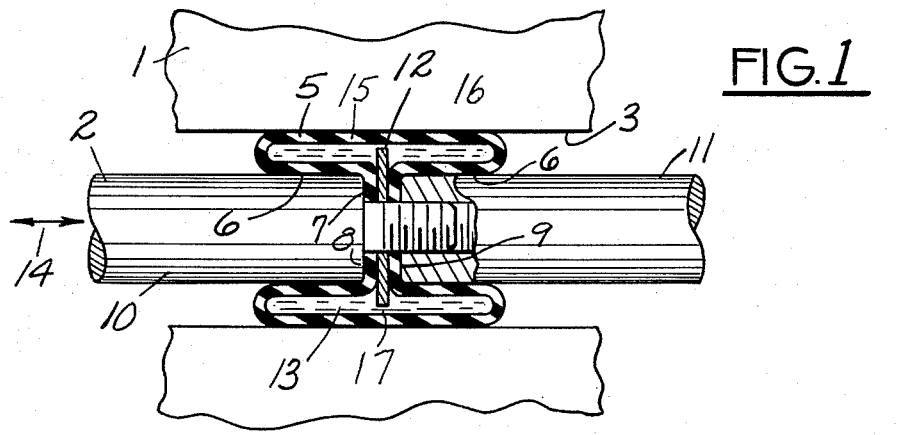
Figure 2:
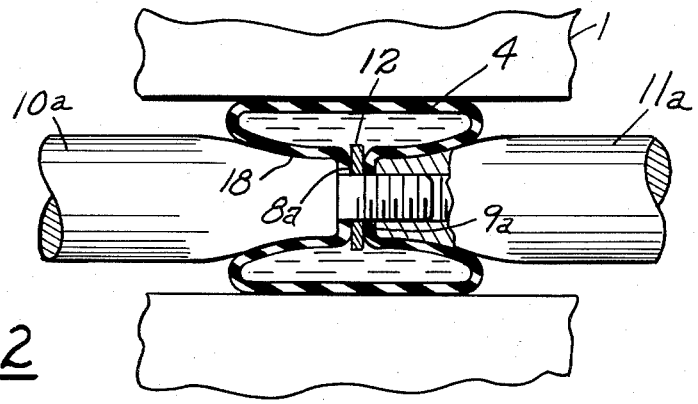
Figure 3:
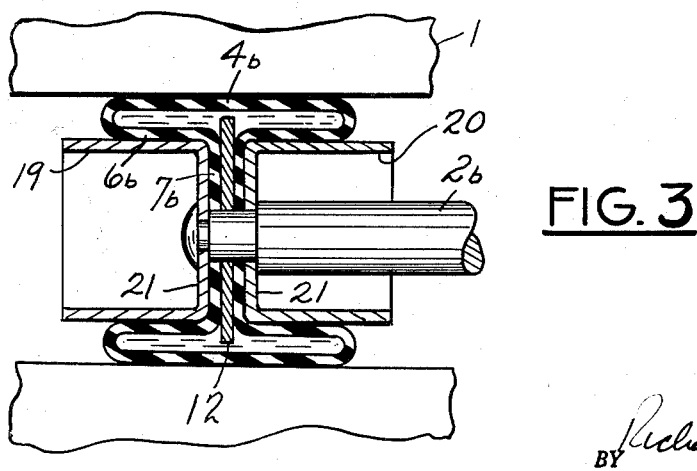

In the drawing, FIG. 1 is a longitudinal section through a damper, FIG. 2 is a section through a modification, and FIG. 3 is a section through another modification.

The mounting has force transmitting and force receiving members 1 and 2 for connection to the supporting and supported members of a resilient mounting system to reduce the relative excursion under vibration and shock conditions. The outer member 1 has a cylindrical cavity or bore 3 frictionally engaging the outer surface of a flexible tube 5 which may be made of rubber or other elastomer, suitably reinforced if desired. The tube should be non porous. Stretchability is not required, although it may be present. The friction grip is ordinarily sufficient to maintain the tube positioned within the member 1. If necessary, the mid point of the tube could be anchored to the member 1 by suitable attachment.

The ends of the tube are telescoped inward providing dished shaped re-entrant portions 6 terminating in inwardly directed flanges 7 which are clamped between opposed radially extending shoulders 8, 9 on parts 10, 11. A washer 12 may be arranged between the flanges 7. When the parts 10, 11 are screwed together, the flanges 7 are sealed against the washer 12 and the shoulders 8, 9. This provides an annular envelope which is filled with a viscous liquid 13. Upon relative movement between the members 1, 2 in an axial direction indicated by arrow 14, one end of the tube telescopes further inward and the other end of the tube moves outward, thereby producing a shearing action between the walls 15, 16 and the fluid 13. The movement also causes shifting of the fluid past the restriction 17 between the periphery of the washer 12 and the inner wall 15 of the tube. The restriction between the washer and the tube makes the damper velocity sensitive. The restriction may be varied in size or the washer may be eliminated entirely. There are many commerically available viscous liquids for the damper ranging from liquid to grease-like consistencies. Silicone greases are especially adapted for operation over wide temperature ranges.

The damper of FIG. 2 is essentially the same as the FIG. 1 damper except that the inner member 10a, 11a has relieved sections 18 adjacent the shoulders 8a, 9a. This provides more freedom of movement and less shearing action when the inner member is at mid position. As the inner member moves toward extreme positions in which one of the re-entrant ends of the tube 4 is partially withdrawn from the tube, the shearing action and the resulting damping builds up. This modification is, accordingly, both amplitude sensitive and velocity sensitive. Omission of the washer 12 would make the damper essentially amplitude sensitive.

In the modification of FIG. 3, the inner member 2b is riveted to the bottom of opposed cups 19, 20. The tube 4b has re-entrant ends 6b terminating in inwardly extending flanges 7b which are clamped between the bottom walls 21 of the cups. This modification is adapted to dampers of large size. In operation, it is substantially the same as the FIG. 1 damper.

What is claimed as new is:

A damper comprising a force transmitting member, a force receiving member, a radially outwardly presented surface on one of said members, a radially inwardly presented surface on the other of said members surrounding and spaced radially outward of said outwardly presented surface, said surfaces being in telescoping relation to each other and defining an annular space therebetween, a tubular member of flexible material having its outer surface engaging said inwardly presented surface and having inwardly dished ends overlying said outwardly presented surface and sealed to said one member, a viscous liquid filling the tubular member, and a washer fixed to said one member between said ends of the tubular member and having its outer peripheral edge projecting close to the inner surface of the portion of the tube that contacts the radially inwardly presented surface of the other member for defining an annular passageway between the peripheral edge of the washer and the inner adjacent portion of the tubular member wherein a resistance to the passage of liquid is effected.

References Cited in the file of this patent

UNITED STATES PATENTS

| 2,851,101 | Bachi | Sept. 9, 1958 |
| 2,864,258 | Klingler | Dec. 16, 1958 |
| 2,945,689 | Klingler | July 19, 1960 |
| 2,961,233 | Ullrich | Nov. 22, 1960 |
| 2,963,259 | Heyer et al. | Dec. 6, 1960 |
| 3,008,703 | Slemmons et al. | Nov. 14, 1961 |
| 3,109,520 | Vossieck | Nov. 5, 1963 |

FOREIGN PATENTS

| 1,109,578 | France | Sept. 28, 1955 |